United States Patent [19]

Saiai et al.

[11] Patent Number: 5,075,277

[45] Date of Patent: Dec. 24, 1991

[54] STEAM REFORMING CATALYST FOR HYDROCARBON AND METHOD FOR MANUFACTURING THE SAME

[75] Inventors: Akira Saiai; Yasuharu Yokoyama; Satoshi Sakurada; Takao Hashimoto; Tomoko Segawa; Fumiya Ishizaki, all of Ooi, Japan

[73] Assignees: Tonen Corporation; Petroleum Energy Center, both of Tokyo, Japan

[21] Appl. No.: 572,274

[22] Filed: Aug. 24, 1990

[30] Foreign Application Priority Data

Aug. 25, 1989 [JP] Japan .................. 1-219208

[51] Int. Cl.$^5$ .............................. B01J 23/40
[52] U.S. Cl. .................... 502/333; 502/332; 502/334; 502/335; 502/336
[58] Field of Search ............... 502/332, 333, 334, 335, 502/336; 423/652, 653

[56] References Cited

U.S. PATENT DOCUMENTS

| | | | |
|---|---|---|---|
| 3,222,132 | 12/1965 | Dowden | 423/652 |
| 3,385,670 | 5/1968 | Van Hook et al. | 423/652 |
| 3,737,291 | 6/1973 | Lhonore et al. | 423/653 X |

FOREIGN PATENT DOCUMENTS

62-261803 11/1987 Japan .................. 502/334

Primary Examiner—William J. Shine
Attorney, Agent, or Firm—Armstrong, Nikaido, Marmelstein, Kubovcik & Murray

[57] ABSTRACT

In the steam reforming catalyst for hydrocarbon according to the present invention, catalyst metal is supported on or in the surface layer of a zirconia carrier containing yttria and having a crystal structure primarily consisting of tetragonal system or tetragonal and cubic systems. Compared with conventional steam reforming catalyst, it has higher reaction efficiency and suppresses carbon deposition extensively even when steam/carbon ratio is low and exhibits higher hydrogen generation efficiency and higher catalyst strength. Particularly, it is suitable as a catalyst for internal reforming type fuel cell.

In the steam reforming catalyst of hydrocarbon of this invention, metal catalyst can be effectively utilized by supporting metal catalyst only on surface layer of zirconia carrier.

9 Claims, 4 Drawing Sheets

STEAM REFORMING CATALYST FOR HYDROCARBON AND METHOD FOR MANUFACTURING THE SAME

BACKGROUND OF THE INVENTION

The present invention relates to a reforming catalyst for hydrocarbons, and in particular to a steam reforming catalyst for hydrocarbons for the improvement of steam reforming catalyst in oil refinery and steam reforming catalyst for fuel cell by providing longer life through suppression of carbon deposition and by effectively utilizing catalytic components, particularly, noble metal components.

The steam reforming for hydrocarbons is a method to manufacture gas consisting of hydrogen and carbon oxides by bringing hydrocarbon and steam in contact with a catalyst. As the typical steam reforming catalysts known in the past, there are alumina type carrier containing alkaline metal oxide, alkaline earth metal oxide and silica, supporting nickel, iron, cobalt, platinum, rhodium, ruthenium, palladium, etc. (Japanese Provisional Patent Publication No. 50-126005 and Japanese Provisional Patent Publication No. 61-280554).

It has been also reported that the catalysts having nickel, cobalt or ruthenium supported on zirconia carrier have also excellent characteristics as the catalyst of this type (Japanese Patent Publication No. 43-12410; T. Igarashi et al.: "Steam Reforming Reaction of n-Butane on $Rh/ZrO_2$"; 58th Catalyst Symposium (A), 4B12, pp. 176–177, etc.).

There is also a more recent report, describing that zirconia supporting rhodium exhibits excellent performance in steam reforming reactions for hydrocarbon. (T. Ohtaka et al.: "n-Butane-Steam Reaction on $Rh/ZrO_2$ Catalyst added with a Third Component; 62nd Catalyst Symposium, 3B305, pp. 118–119.).

Additionally disclosed is a noble metal catalyst supported on a surface layer of a catalyst carrier such as alumina, silica, zirconia, etc. (Japanese Provisional Patent Publication No. 53-78735 and Japanese Provisional Patent Publication No. 48-53980).

On the other hand, steam reforming catalyst have been widely used for industrial application in the reforming of petroleum and petroleum distillate, etc. It has been proposed recently to use a fuel cell with hydrocarbon as the raw material instead of the so-called fuel gas containing hydrogen or hydrogen and carbon monoxide by furnishing a steam reforming catalyst within fuel cell (Japanese Provisional Patent Publication No. 61-260554).

The conventional catalyst of alumina supporting nickel, cobalt, etc. can be successfully used for steam reforing of gaseous or light paraffin when the steam/carbon (i.e., carbon in the raw material hydrocarbon) mol ratio (S/C) is small, however the catalyst is inadequate because coking occurs when the raw material contains a large quantity of unsaturated hydrocarbon such as olefin or the raw material has a relatively large molecular weight such as when heavy hydrocarbons are used. When coking occurs, differential pressure of the catalyst bed increases and reaction efficiency is decreased, finally blocking the catalyst bed. For this reason, coking could be suppressed by increasing the steam/carbon ratio, however there arises the problem that excess steam is required for reaction.

Also, the increase of differential pressure of catalyst bed raises the load of the system. If catalyst bed is blocked, catalyst must be replaced or regenerated. This leads to temporary suspension of the reaction, and more complicated apparatus is needed if catalyst is to be replaced or regenerated without stopping the reaction. Above all, in the internal reforming type fuel cell, the replacement or the regeneration of catalyst means more difficulties, and it is desirable to suppress the coking of catalyst as practical as possible.

It is naturally preferable that the reaction efficiency in steam reforming is high, and the efficiency of the cell itself is an important key for the practical application of fuel cell. Thus, high efficiency of steam reforming of the catalyst furnished in fuel cell is very important.

The first object of the present invention is to offer a steam reforming catalyst for hydrocarbons with excellent mechanical strength, causing no coking and providing longer life of catalyst.

The second object of the invention is to offer a steam reforming catalyst for a fuel cell with high steam reforming efficiency and with no coking.

Further, the third object of the invention is to offer a steam reforming catalyst for hydrocarbons for effective utilization of the catalyst metal and a method for manufacturing the same.

SUMMARY OF THE INVENTION

The steam reforming catalyst for hydrocarbon according to the present invention is characterized in that catalyst metal is supported on zirconia carrier containing yttria and having crystal structure primarily of tetragonal system or tetragonal and cubic systems.

Also, the steam reforming catalyst for hydrocarbon of this invention is characterized in that catalyst metal is carried on surface layer of the zirconia carrier containing yttria and having crystal structure of tetragonal system or tetragonal and cubic systems.

It has been found that the steam reforming catalyst for hydrocarbon of this invention has better steam reforming catalyst performance than the conventional type steam reforming catalyst and is more suitable as the steam reforming catalyst for a fuel cell because catalyst metal is supported on zirconia carrier, which contains yttria and has crystal structure primarily consisting of tetragonal system or tetragonal and cubic systems.

Tetragonal or cubic zirconia containing a small quantity of yttria is known as partially stabilized zirconia. Partially, stabilized zirconia has a high oxygen ionic conductivity, which may be related to the activation of oxygen ions in water or to the effect to suppress coking.

Particularly, the steam reforming catalyst for hydrocarbons with high catalytic activity and coking suppression effect can be provided by using zirconia carrier containing yttria by 0.5 to 20 mol % and having the crystal structure with tetragonal system at least by 35% or more.

According to the present invention, the steam reforming catalyst having high reaction efficiency, good coking suppression effect and high hydrogen generation efficiency even when steam/carbon ratio is low can be obtained. Because this catalyst is stable to alkaline metal salt, it is suitable as a catalyst for an internal reforming type fuel cell to be incorporated in cell and disposed near alkali metal salt electrolyte.

In the steam reforming catalyst for hydrocarbon of this invention, metal catalyst can be effectively utilized because metal catalyst is supported only on the surface layer of zirconia carrier.

In this case, by using a noble metal as the metal catalyst component, higher selectivity of the reforming reaction and the better supsression of carbon generation can be obtained compared with conventional type reforming catalyst. Further, precious metal catalyst can be effectively utilized, and a steam reforming catalyst for hydrocarbon with high mechanical strength can be obtained.

DESCRIPTION OF THE PREFERRED EMBODIMENTS

Figure 1:
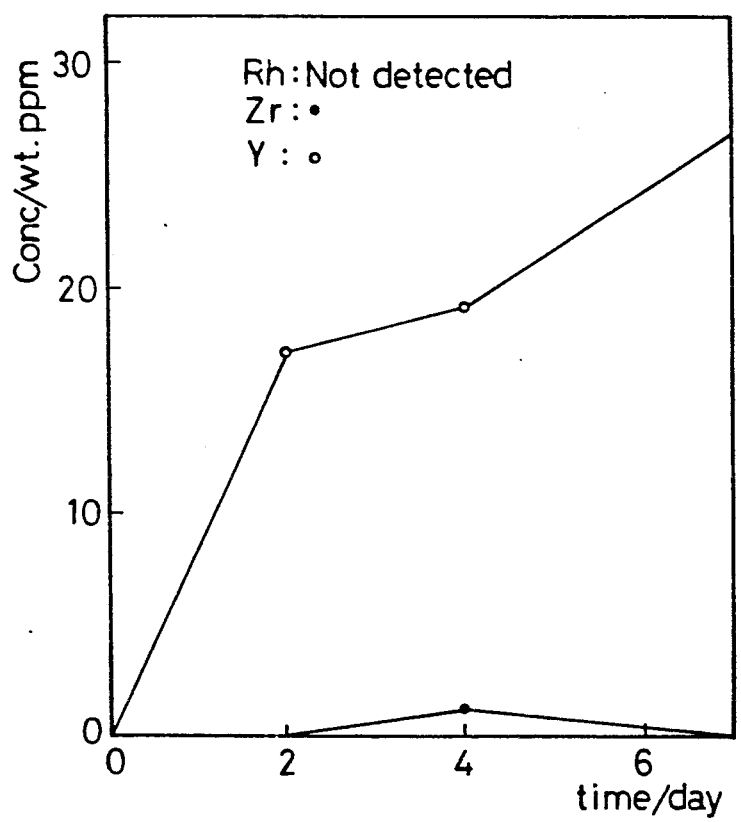
FIG. 1 is a diagram to show the change of the component elution in the molten carbonate of the catalyst of this invention.

In the following, description is given in detail on the steam reforming catalyst for hydrocarbon and the method for manufacturing the same according to this invention.

First, a zirconia carrier is manufactured by pressure molding after the mixture of a yttrium compound and a zirconium compound in the predetermined ratio are calcined. The mixture of the yttrium compound and the zirconium compound can be manufactured by the alkoxide hydrolytic method or by the thermal decomposition method using yttrium chloride ($YCl_3$) and zirconium oxychloride ($ZrOCl_2$) as raw materials, whereas the method of using ammonia water and to neutralizing by coprecipitation is suitable for obtaining a mixture with uniform composition and good particle property. When the coprecipitation method is used, the deposited mixture is to be calcined after washing and drying.

The yttria content in the catalyst composition is preferably 0.5-20 mol %, or more preferably, 1.0-10 mol %, or still more preferably, 1.5-6 mol %. If the yttria content is higher than this, the mechanical strength of catalyst is decreased. If the yttria content is lower than the above quantity, the mechanical strength becomes insufficient for practical use as a catalyst.

The reasons for this are that a zirconia carrier containing yttria has primarily a tetragonal crystal structure under the temperature condition for catalyst calcining and reforming reaction (about 600–1000° C.) and that, if the yttria content is lower than 0.5 mol %, the ratio of monoclinic system increases. If it exceeds 20 mol %, the ratio of cubic system increases.

In other words, it has been found by this invention that, if monoclinic and cubic systems increase in crystal structure of the zirconia carrier, the mechanical strength is decreased. In the temperature range for preparation of the catalyst or for steam reforming reaction, it is necessary that at least 35% or more of the crystal structure consisting of cubic and tetragonal systems is tetragonal system. In the zirconia carrier of this invention, the ratio of tetragonal system is preferably 98-35%, or more preferably, 90-50%. The more tetragonal system is contained, the higher the mechanical strength is increased.

As the catalyst metal component to be supported on the zirconia carrier containing yttria, noble metal components such as rhodium, ruthenium, palladium, platinum, etc. and normal reforming catalyst components such as nickel, cobalt, iron, etc. may be used.

There is no restriction on the quantity of catalyst metal supported on zirconia carrier containing yttria, whereas it is preferably contained by 0.01-10 wt % to total weight of the carrier and metal, or more preferably by 0.1-3 wt %. If catalyst metal quantity is too much, it is not economical. On the other hand, if catalyst metal quantity is too little, the activity is lowered, and the reforming of hydrocarbon may be insufficient.

The zirconia carrier containing yttria used in the present invention is generally in cylindrical, ring or granular shape, but it is not necessarily limited to such shape. It may be fibrous or may be of 3-dimensional structure, or it may be used as complex structure with the other carrier. As the internal reforming catalyst, granular carrier with small particle size is preferable.

The method of supporting a catalyst metal on a zirconia carrier containing yttria can be performed by a known procedure, and the impregnation procedure is normally adopted. It is preferable to adopt the impregnation procedure to support the catalyst metal only on the surface layer of zirconia carrier containing yttria.

To adsorb the catalyst metal component only on external surface of the carrier, it is necessary to select a solvent having a lower affinity to the catalyst metal component than to the carrier, suppressing the affinity to carrier adequately. Namely, the above purpose is attained by using a specific organic solvent which does not allow the catalyst metal to penetrate into the carrier.

The solvents suitable for surface supporting of catalyst metal salts on a zirconia carrier containing yttria are the ketones such as acetone, methylethylketone, diethylketone, etc., the alcohols such as methanol, ethanol, etc., the fatty acid compounds including fatty acids and fatty acid esters such as acetic acid, methyl acetate, ethyl acetate etc., and the ethers such as diethyl ether. Further, a mixture of the above organic solvents with the other solvents such as water, hydrocarbon, etc. may be used. Water can be used up to 50% in the mixed solvent. It is not desirable to use too much water, otherwise the catalyst metal component is penetrated into the carrier.

When the catalyst metal is supported only on the surface layer of the carrier, the effect of this invention is provided most extensively in the case where the catalyst metal component is rhodium, ruthenium, palladium, platinum or the noble metal catalyst composed of the mixture of these substances.

Particularly, rhodium or ruthenium is most desirable in the combination with zirconia carrier containing yttria according to this invention. As the noble metal compound, ruthenium chloride ($RuCl_3 \cdot 3H_2O$), ruthenium red ($Ru_2(OH)_2Cl_4 \cdot 7NH_3 \cdot 3H_2O$), etc. may be used. These compounds are preferably dissolved in the above solvent by 0.05-5%, or more preferably, by 0.1-2%. Naturally, the catalyst metal component is not limited to noble metal catalysts, and it may be a normal catalyst metal such as nickel, iron, cobalt, etc. which have been used as steam reforming catalyst in the past.

To adsorb the catalyst metal salt on the catalyst carrier using the metal salt solution thus prepared, the catalyst carrier should be placed and immersed in the metal salt solution. The ratio of the quantity of the solution to the quantity of carrier is preferably 1:1 to 50:1 in the weight ratio, or more preferably, 3:1 to 10:1. The immersion time is preferably 1 minute to 24 hours.

To adsorb catalyst metal salt only on the surface layer of the catalyst carrier, the solution concentration, the quantity of the solution, the immersion time, etc. exert influence. By adequate combination of these factors, it can be adsorbed only on the surface layer, and this can be easily confirmed by X-ray microanalysis.

By immersing the catalyst carrier into the metal salt solution and by drying it thereafter, the catalyst of this invention can be obtained. It can be used for the reforming reaction after hydrogen reduction.

The steam reforming reaction of hydrocarbons is given by the following reaction formulae:

$$C_mH_n + mH_2O \rightarrow mCO + \left(\frac{n}{2} + m\right)H_2$$

$$CH_4 + H_2O \rightarrow CO + 3H_2$$

$$CO + H_2O \rightarrow CO_2 + H_2$$

where m: about 1 to 20 n: about 4–42

In general, the reaction temperature is 300–1000° C., while the temperature of 700° C. or lower may be suitable because coking is not favored in the catalyst of this invention.

The reaction pressure is about 0.01–50 kg/cm²G, or more preferably about 0.1–30 kg/cm²G.

From the viewpoint of productivity, it is preferable that the steam/carbon mol ratio (S/C) is low, while, to avoid the problem of coking, it is preferably 1.2 or more, or more preferably, 1.4 or more.

As the raw materials to be used for steam reforming reaction, there are, for example, the gas containing light hydrocarbon such as LNG or LPG, petroleum distillate such as naphtha, kerosene, etc., or hydrocarbons such as coal-liquefied oil. Particularly, hydrocarbons with relatively lower molecular weight ($C_1$ to $C_{20}$) may be used. It is preferable that a raw material gas consists of hydrocarbon only, whereas the other components may be contained in trace quantity Sulfur compounds as the other component is contained preferably by 0.5 ppm or less in case raw material is naphtha. Kerosene normally contains sulfur compounds by about 50 ppm. If this is used as raw material, it is desirable to use it after the sulfu-content is reduced to less than 0.5 ppm. Hydrodesulfurization is adopted as the removal means.

Further, the specific gravity of hydrocarbon used as raw material is preferably 0.80 or less, or more preferably, 0.75 or less. C/H weight ratio of such hydrocarbon is preferably 6.5 or less, or more preferably, 6.0 or less.

Because the catalyst of this invention has high reforming (conversion) efficiency and is highly effective in suppressing coking, it can be used as the steam reforming catalyst for a fuel cell using hydrocarbons as raw material. For example, in the molten carbonate type fuel cell, it has been pointed out that the activity is decreased because molten carbonate, from the electrolyte is scattered around and deposited on catalyst surface. As will be explained in the embodiments later, the catalyst according to this invention is stable to carbonate, and it is particularly useful for the application on internal reforming type fuel cell. It is desirable to arrange the catalyst layer in the internal reforming type fuel cell in the anode side fuel gas passage of each cell or between stacked cells.

In the following, the features of the invention are described by the embodiments:

EMBODIMENT 1

Tetragonal zirconia powder containing yttria of 3 mol % or 8 mol % as obtained by the coprecipitation method was processed by pressure molding into pellets (10 mmφ×3 mm). After this was calcined at 1000° C. for 3 hours, it was pulverized and classified, and a catalyst carrier of 6–16 mesh (pore volume: 0.2 cc/g) was obtained. Next, this was immersed in an aqueous solution of rhodium chloride for 24 hours and was then dried. By calcining this at 500° C. for one hour, a catalyst containing 0.5 wt % rhodium was obtained.

The catalysts using tetragonal zirconia containing 3 mol % and 8 mol % yttria as carrier are identified as catalyst A and catalyst B respectively.

REACTION TEST

As the hydrocarbon material, desulfurized light naphtha (specific gravity 0.702; C/H weight ratio 5.52; sulfur content 50 ppb or less) was used. The reaction was conducted at 650° C. and 0.2 kg/cm²G, changing steam/carbon mol ratio (S/C) and material supply spatial velocity (GHSV) as follows:

S/C mol ratio: 3–1.5

GHSV: 8,000–12,000

These reaction products were quantitatively analyzed by gas chromatography. The results are shown in Tables 1 and 2.

Here, non-conversion ratio is the ratio of non-conversion (residual ratio) of hydrocarbon of $C_2$ or higher to the raw material hydrocarbon.

COMPARATIVE EXAMPLE 1

For comparison purpose, the above reaction was repeated, using the steam reforming catalysts X, Y and Z commercially available for naphtha. The results are also shown in Tables 1 and 2.

The catalysts X, Y and Z have the following compositions:

| Components | Commercial catalysts (wt %) | | |
|---|---|---|---|
| | X | Y | Z |
| Ni | 11.1 | 16.2 | 15.6 |
| $Al_2O_3$ | 88.9 | 24.7 | 25.7 |
| MgO | — | 10.7 | 11.9 |
| CaO | — | 19.3 | 16.1 |
| $K_2O$ | — | 6.7 | 6.2 |
| $SiO_2$ | — | 19.0 | 13.6 |

Rhodium was supported on zirconia not containing yttria according to the same procedure as above of supporting rhodium on zirconia carrier containing yttria the catalyst P, and the above reaction was repeated. The results are also shown in Tables 1 and 2.

TABLE 1

| Material supply spatial velocity | Catalyst | H$_2$ | CO | CO$_2$ | CH$_4$ | C$_2$ | C$_3$ | C$_4$ | C$_5$ | Non-conversion ratio | ΔP |
|---|---|---|---|---|---|---|---|---|---|---|---|
| 8000 | A | 66.27 | 12.63 | 13.92 | 5.30 | — | — | — | — | 0.00 | No increase |
|  | B | 66.39 | 12.71 | 13.52 | 5.52 | — | — | — | — | 0.00 | " |
|  | P | 63.97 | 14.12 | 12.41 | 7.20 | — | — | — | 0.003 | 0.05 | " |
|  | X | 69.31 | 10.09 | 15.43 | 3.20 | — | — | — | 0.007 | 0.12 | " |
|  | Y | 67.84 | 11.29 | 14.08 | 3.26 | — | — | — | — | 0.00 | " |
|  | Z | 66.77 | 10.88 | 13.49 | 3.75 | — | — | — | — | 0.00 | " |
| 12000 | A | 67.52 | 11.27 | 14.88 | 4.31 | — | — | — | — | 0.00 | " |
|  | B | 66.18 | 11.87 | 14.38 | 5.91 | — | — | — | — | 0.00 | " |
|  | P | 62.83 | 13.28 | 13.47 | 8.87 | — | — | — | 0.03 | 0.42 | " |
|  | X | 69.36 | 8.97 | 16.43 | 2.47 | 0.07 | 0.05 | 0.03 | 0.14 | 3.76 | " |
|  | Y | 68.05 | 10.59 | 14.86 | 3.76 | — | — | — | 0.03 | 0.51 | " |
|  | Z | 67.39 | 11.14 | 13.72 | 5.18 | 0.02 | — | — | 0.04 | 0.79 | " |

Reaction temperature: 650° C.;
S/C = 3.0;
ΔP is the pressure drop through catalyst bed

TABLE 2

| S/C | Catalyst | H$_2$ | CO | CO$_2$ | CH$_4$ | C$_2$ | C$_3$ | C$_4$ | C$_5$ | Non-conversion ratio | ΔP |
|---|---|---|---|---|---|---|---|---|---|---|---|
| 2.5 | A | 67.98 | 9.25 | 16.03 | 4.44 | — | 0.004 | — | 0.02 | 0.38 | No increase |
|  | B | 65.01 | 13.64 | 12.62 | 7.13 | — | — | — | — | 0.00 | No increase |
|  | P | 63.82 | 14.17 | 12.67 | 7.01 | — | 0.006 | — | 0.02 | 0.45 | No increase |
|  | X, Z |  |  |  |  |  |  |  |  |  | Complete blocking |
|  | Y | 67.66 | 12.28 | 13.98 | 4.67 | 0.005 | — | — | 0.03 | 0.43 | No increase |
| 2.0 | A | 66.64 | 9.91 | 16.12 | 6.12 | — | 0.007 | — | 0.02 | 0.44 | No increase |
|  | B | 59.88 | 15.66 | 11.50 | 11.99 | — | — | 0.015 | — | 0.15 | No increase |
|  | P | 61.59 | 15.94 | 10.46 | 13.57 | — | 0.01 | — | 0.04 | 0.70 | No increase |
|  | X, Y |  |  |  |  |  |  |  |  |  | Complete blocking |
|  | Y | 63.70 | 14.07 | 12.27 | 6.93 | 0.02 | — | — | 0.04 | 0.72 | No increase |
| 1.5 | A | 62.58 | 10.54 | 15.21 | 9.41 | 0.09 | 0.03 | — | 0.08 | 1.90 | No increase |
|  | B | 56.36 | 16.59 | 10.42 | 14.60 | 0.005 | — | — | 0.02 | 0.23 | No increase |
|  | P |  |  |  |  | . — |  |  |  |  | Increase |
|  | Y |  |  |  |  | — |  |  |  |  | Increase |

Reaction temperature: 650° C.
Spatial velocity: 8,000

Referring to Tables 1 and 2, the catalysts A and B, which are the embodiments of this invention, exhibited increased conversion ratio when material supply spatial velocity is increased compared with Ni/Al$_2$O$_3$ type catalyst (catalyst X) and Ni composite oxide type catalysts (Y and Z). When S/C is decreased the pressure drop through catalyst bed is not increased or catalyst bed is not blocked. Also, compared with Rh/ZrO$_2$ type catalyst (catalyst P), H$_2$/C. (efficiency to generate H$_2$, which is the fuel of fuel cell) is increased.

EMBODIMENT 2

The catalyst A prepared in embodiment 1 (rhodium supported on zirconia containing 3 mol % yttria) was pulverized into pieces of 8-16 mesh, and 4.6 g of this was weighed and was immersed in 70 g of molten carbonate (Li/K=62/38) at 650° C.

Then, the elution quantity of the catalyst component after 2, 4 and 7 days was measured. The results are shown in FIG. 1.

It is evident from the figure that zirconia almost was not eluted at all, and yttria was eluted slightly, i.e. about 25 ppm on 7th day. This reveals that catalyst A is stable to the molten carbonate.

COMPARATIVE EXAMPLE 2

The catalyst Y in the comparative example 1 (nickel supported on composite oxide) was pulverized in the same procedure as in embodiment 2, and 5.0 g of this was weighed. Then, this was immersed in molten carbonate according to the same procedure as in the embodiment 2, and the elution quantity of catalyst component was determined.

Figure 2:
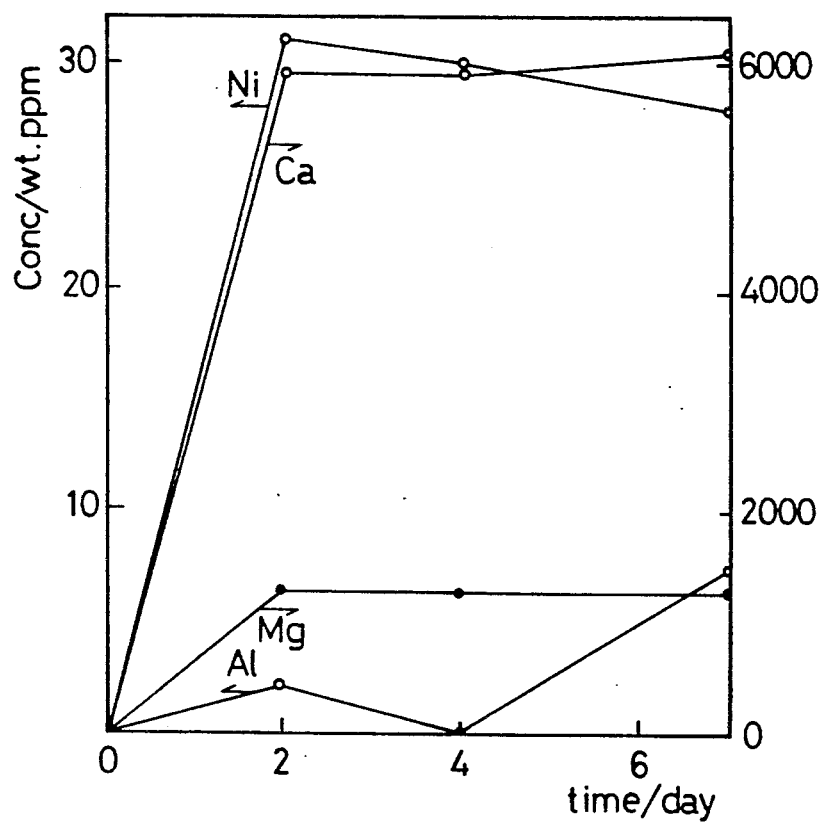
FIG. 2 is a diagram to show the change of the component elution in the molten carbonate of a comparative catalyst.
Figure 3:
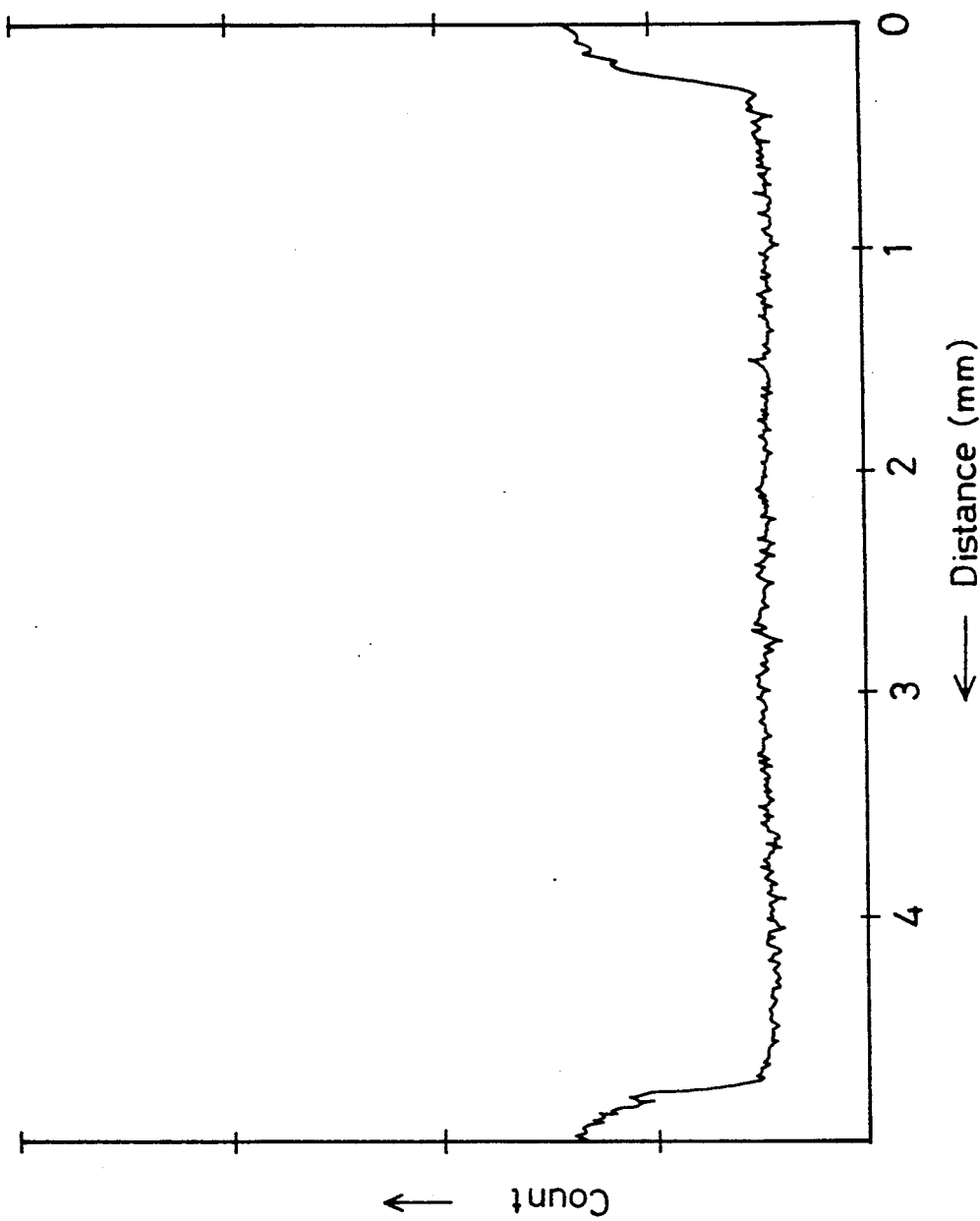
FIG. 3 is a diagram to explain the measurement results by X-ray microanalyzer on the catalyst A of this invention.
Figure 4:
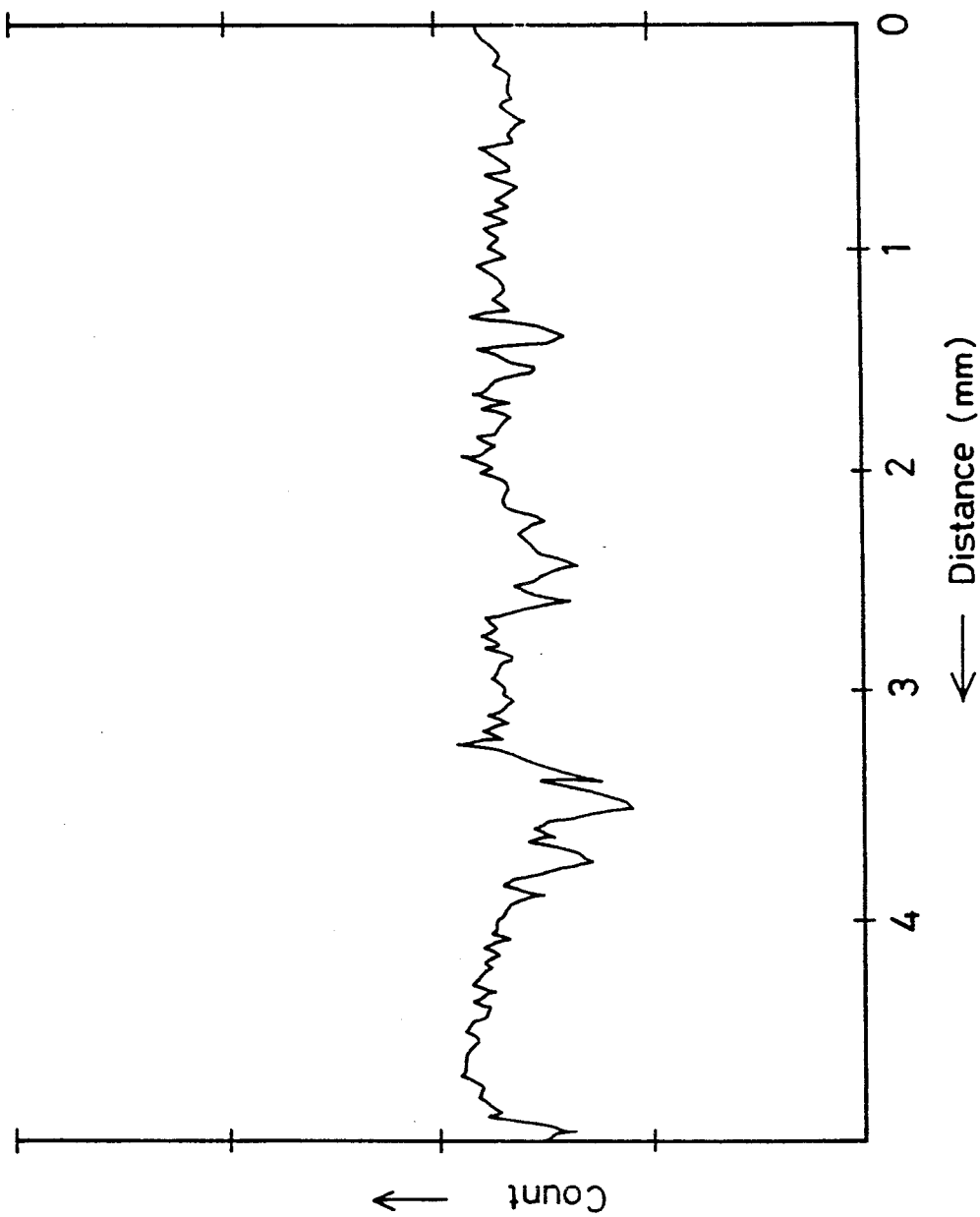
FIG. 4 is a diagram to explain the measurement results by X-ray microanalyzer on a comparative catalyst X.

The results are given in FIG. 2. It is evident from the figure that alkaline earth metal was eluted to considerable extent. Mg was eluted by 26% of the total quantity, and Ca by 59%.

EMBODIMENT 3

By the same procedure as in embodiment 1, tetragonal zirconia catalyst carrier (powdery) containing 3 mol % of yttria was prepared. Then, 12.0 g of it was immersed in an aqueous solution of ruthenium chloride, and it was then boiled and impregnated. By repeating impregnation twice, 0.5 wt % (catalyst standard) of ruthenium was supported on the zirconia containing yttria. After this was dried at 120° C., it was calcined at 500° C. for 2 hours.

Using this catalyst, the same reaction as described in the embodiment 1 was performed, except that GHSV was changed to 8,000 and S/C to 3–1.5. The results are sown in Table 3.

TABLE 3

| S/C | H$_2$ | CO | CO$_2$ | CH$_4$ | C$_2$ | C$_3$ | C$_4$ | C$_5$ | Non-conversion ratio | ΔP |
|---|---|---|---|---|---|---|---|---|---|---|
| 3.0 | 68.58 | 11.20 | 14.61 | 3.36 | — | — | — | — | 0.00 | No increase |

TABLE 3-continued

| S/C | H$_2$ | CO | CO$_2$ | CH$_4$ | C$_2$ | C$_3$ | C$_4$ | C$_5$ | Non-conversion ratio | ΔP |
|---|---|---|---|---|---|---|---|---|---|---|
| 2.0 | 62.34 | 14.55 | 12.21 | 8.57 | 0.007 | 0.002 | — | 0.024 | 0.39 | No increase |
| 1.5 | 58.58 | 16.09 | 10.37 | 11.36 | 0.034 | 0.007 | — | 0.058 | 0.99 | No increase |

Reaction temperature: 600° C.
Spatial velocity: 8,000

The results in Table 3 reveal that the catalyst of this invention has higher reaction efficiency, suppresses carbon deposition and exhibits higher hydrogen generation efficiency even when ruthenium was used as the catalyst metal.

EMBODIMENT 4

(1) Preparation of catalyst C of this invention

To a solution of 0.13 g of ruthenium chloride (RuCl$_3$.3H$_2$O) dissolved in 50 ml of acetone, 25 g of commercial tetragonal zirconia carrier containing 3 mol % yttria (5 mmφ×3 mm) (Trade name TZ-3YB; Toso Co., Ltd.) was added, and the ruthenium compound was completely adsorbed. After the solvent was removed, it was dried at 100° C. for 3 hours, and the catalyst of this invention was obtained. When this catalyst was analyzed by X-ray microanalysis, 99% of ruthenium was supported on the portion 0.3 mm from the surface as shown in FIG. 1.

(2) Preparation of catalyst D

Catalyst D was prepared according to the same procedure as in (1) above except that, instead of acetone solution of ruthenium, a solution of 0.25 g of ruthenium (RuCl$_3$.3H$_2$O) in 50 ml of water was used. When this catalyst was analyzed by X-ray microanalysis, ruthenium was carried uniformly deep into the catalyst as shown in FIG. 2, and it was evidently different from catalyst C of the present invention.

(3) Catalyst E (nickel catalyst)

Of the commercial steam reforming catalyst for naphtha, the catalyst with the highest anti-coking property was used as a comparative catalyst E.

The composition (wt %) was:

| | |
|---|---|
| Ni | 16.2 |
| Al$_2$O$_3$ | 24.7 |
| MgO | 10.7 |
| CaO | 19.3 |
| K$_2$O | 6.7 |
| SiO$_2$ | 19.0 |

This catalyst was uniformly impregnated.

Steam reforming reaction activity

Into each reaction tube, 1.2 cc each of the above catalysts C, D and E was filled, and these were reduced in hydrogen atmosphere at 788° C. Using desulfurized light naphtha (specific gravity 0.70; C/H weight ratio 5.52; sulfur component 50 ppb) as hydrocarbon material, the reaction was performed at 650° C. (at reaction tube outlet), and 0.2 kg/cm$^2$G, steam/carbon (S/C) mol ratio of 1.5 and material supply spatial velocity (GHSV) of 8,000 h$^{-1}$. The results are given in the table below.

| Catalyst | Composition of produced gas (vol %, dry base) | | | | |
|---|---|---|---|---|---|
| | H$_2$ | CO | CO$_2$ | CH$_4$ | C2-C5 |
| C | 59.75 | 17.40 | 10.54 | 10.87 | — |
| D | 59.96 | 18.58 | 10.94 | 10.73 | — |
| E | Data not collectable due to ΔP increase in the catalyst bed | | | | |

As it is evident from this table, the catalyst of this invention shows the same reforming activity as that of catalyst D uniformly supported by catalyst metal using an aqueous solution of ruthenium chloride and also exhibits the better reactivity and anti-coking properties (coking suppressive effect) than the conventional type uniformly supported nickel catalyst E.

EMBODIMENT 5

Zirconium hydroxide was processed by pressure molding into a cylindrical shape with a diameter of 5 mm and a height of 5 mm and was calcined for 3 hours at 1000° C. Then, ruthenium was supported on surface in an amount of 0.5 wt % by the same procedure as in catalyst C of this invention in embodiment 4, and catalyst F, not containing yttrium, was obtained.

Further, the hydroxide mixture containing yttria of 3 mol % and 8 mol %, which was obtained by coprecipitation from zirconium oxychloride (ZrOCl$_2$) and yttrium chloride (YCl$_3$), was molded and calcined by the same procedure as in catalyst F. By same procedure as in catalyst C of the embodiment 4, 0.5 wt % of ruthenium was supported on it, and catalysts G and H were prepared.

The catalysts F, G and H were analyzed by X-ray diffraction analysis and the crystal phase was quantitatively analyzed by Rietbelt method (Journal of the Japan Crystallography Association Vol. 27, p. 23, 1985). The results are given in the table below.

| | Yttria content (mol %) | Tetragonal (%) | Cubic (%) |
|---|---|---|---|
| Catalyst F | 0 | Mostly monoclinic | |
| Catalyst G | 3 | 85.7 | 14.3 |
| Catalyst H | 8 | 43.5 | 56.5 |

Steam reforming reaction activity

The above catalysts G and H were filled in reaction tubes and reduction was performed. Then, evaluation test by continuous reaction was performed under the following conditions:

Raw material;
  Light naphtha (specific gravity 0.69; C/H weight ratio 5.38; sulfur component 60 ppb)
Steam/carbon (S/C) mol ratio;
  3.0
Reaction temperature;
  800° C. (at reaction tube outlet)
Reaction pressure;

4 kg/cm²G
Material supply spatial velocity (GHSV); 2,500 h⁻¹

The results of the test are summarized in the table below:

|  | Catalyst G | Catalyst H |
| --- | --- | --- |
| Yttria content (mol %) | 3 | 8 |
| Test time (hr.) | 500 | 320 |
| Decrease of catalyst activity | None* | None* |
| Pressure increase | None | increasing |
| Catalyst shape | No change | Partly pulverized |
| Coking | None | None |

*No unreacted gas was found in the produced gas.

Because the pressure began to increase in the catalyst H, the test was terminated after 320 hours.

EMBODIMENT 6

In the same procedure as in the above embodiment 5, zirconia carriers with 0 mol %, 3 mol % and 8 mol % yttria content with the shape of 15 mm outer diameter, 6 mm inner diameter and 9 mm height were prepared, and ruthenium was supported on surface layer by 0.5 wt % respectively as in embodiment 4. Thus, the catalysts f, g and h were prepared.

Side crushing strength was measured on 20 samples of the above three types of catalysts f, g and h, using Kiya type strength test. Average values obtained from test results were as follows:

|  | Yttria content (mol %) | Strength (kg/mm) |
| --- | --- | --- |
| Catalyst f | 0 | 0.6 |
| Catalyst g | 3 | 3.1 |
| Catalyst h | 8 | 1.5 |

EMBODIMENT 7

Catalyst C of this invention prepared in the embodiment 4 was pulverized into pieces of 8-16 mesh, and 5 g of it was weighed. After immersing it in 70 g of molten carbonate at 650° C. (Li/K=62/38), the elution quantity of the catalyst component after 2, 4 and 7 days was measured.

As a result, it was found that zirconia almost was not eluted at all, and yttrium was slightly eluted, i.e. about 20 ppm on 7th day, and ruthenium was not detected.

This reveals that the catalyst of this invention is stable to the molten carbonate.

What is claimed is:

1. A steam reforming catalyst for hydrocarbon, characterized in that catalyst metal is supported on a zirconia carrier containing 0.5 to 20 mol % yttria and having a crystal structure primarily consisting of a tetragonal system or tetragonal and cubic systems.

2. A steam reforming catalyst for hydrocarbon according to claim 1, wherein said catalyst metal is rhodium, ruthenium, palladium, platinum or a mixture of these substances.

3. A steam reforming catalyst for hydrocarbon according to claim 1, wherein said catalyst metal component is supported on surface layer of zirconia carrier.

4. A steam reforming catalyst for hydrocarbon according to claim 1, wherein yttria content in said zirconia carrier is 1.0 to 10 mol %.

5. A steam reforming catalyst for hydrocarbon according to claim 1, wherein tetragonal system occupies 35% or more in the crystal composition of said zirconia carrier.

6. A steam reforming catalyst for hydrocarbon according to claim 1, wherein said steam reforming catalyst for hydrocarbon is provided in fuel cell and is used to generate cell fuel by reforming hydrocarbon.

7. A method for manufacturing steam reforming catalyst for hydrocarbon, characterized in that catalyst metal component is supported on zirconia carrier containing yttria and having crystal structure primarily consisting of tetragonal system or tetragonal and cubic systems, that solution dissolving catalyst metal salt in at least one type of organic solvent is impregnated in said zirconia carrier, and that catalyst metal is supported on surface layer of zirconia carrier.

8. A method for manufacturing steam reforming catalyst for hydrocarbon according to claim 7, wherein said organic solvent is ether, ketone, alcohol, fatty acid or fatty acid ester.

9. A steam reforming catalyst as defined in claim 1, wherein the zirconia carrier contains 1.5-6.0 mol % yttria.

* * * * *